United States Patent
Fujimori et al.

(10) Patent No.: US 7,766,371 B2
(45) Date of Patent: Aug. 3, 2010

(54) AIRBAG COVER FOR AIRBAG APPARATUS

(75) Inventors: Takeshi Fujimori, Fuji (JP); Saori Wakuda, Fuji (JP)

(73) Assignee: Nihon Plast Co., Ltd. (JP)

( * ) Notice: Subject to any disclaimer, the term of this patent is extended or adjusted under 35 U.S.C. 154(b) by 0 days.

(21) Appl. No.: 11/902,715

(22) Filed: Sep. 25, 2007

(65) Prior Publication Data
US 2008/0079241 A1    Apr. 3, 2008

(30) Foreign Application Priority Data
Sep. 29, 2006   (JP) .............................. 2006-269189

(51) Int. Cl.
*B60R 21/20* (2006.01)
(52) U.S. Cl. .................. 280/728.3; 280/731; 40/593
(58) Field of Classification Search .............. 280/728.2, 280/728.3, 731; 40/593
See application file for complete search history.

(56) References Cited

U.S. PATENT DOCUMENTS

| | | | | |
|---|---|---|---|---|
| 5,851,022 A | * | 12/1998 | Yamamoto et al. ....... | 280/728.3 |
| 6,152,480 A | * | 11/2000 | Iwanaga ................... | 280/728.3 |
| 6,168,187 B1 | * | 1/2001 | Yamada et al. ........... | 280/728.3 |
| 6,568,704 B2 | * | 5/2003 | Iida et al. ................. | 280/728.3 |
| 6,613,415 B2 | * | 9/2003 | Iida et al. .................... | 428/139 |
| 6,692,016 B2 | * | 2/2004 | Yokota et al. ............. | 280/728.2 |
| 6,846,007 B2 | * | 1/2005 | Iida et al. ................. | 280/728.3 |
| 6,942,246 B2 | * | 9/2005 | Hohne et al. ................. | 280/731 |
| 6,951,349 B2 | * | 10/2005 | Yokota et al. ............. | 280/728.2 |
| 7,097,198 B2 | * | 8/2006 | Yokota et al. ............. | 280/728.2 |
| 7,156,415 B2 | * | 1/2007 | Gray et al. ................ | 280/728.3 |
| 7,172,210 B2 | * | 2/2007 | Yokota et al. ............. | 280/728.2 |
| 2004/0256840 A1 | * | 12/2004 | Lutter et al. .............. | 280/728.3 |
| 2007/0290487 A1 | * | 12/2007 | Kreuzer ................... | 280/728.3 |

FOREIGN PATENT DOCUMENTS

JP      2005-104307         4/2005

* cited by examiner

*Primary Examiner*—Toan C To
(74) *Attorney, Agent, or Firm*—NDQ&M Watchstone LLP

(57) ABSTRACT

An airbag cover comprises a cover main body having a cover core covering an airbag and an outer layer disposed on an outer surface of the cover core, an ornament provided on an outer surface of the outer layer, and a fixing structure for fixing the ornament on the outer surface of the outer layer. And, an edge of the outer layer on the outer surface is covered by the ornament. According to this airbag cover having the ornament, it can be easy to form the outer layer.

5 Claims, 4 Drawing Sheets

AIRBAG COVER FOR AIRBAG APPARATUS

BACKGROUND OF THE INVENTION

1. Field of the Invention

The present invention relates to an airbag cover which covers an airbag.

2. Description of the Related Art

An airbag apparatus has come into practical use, which detects a collision of a vehicle and deploys an airbag in a blink between an occupant and an interior part of the vehicle (for example, a steering wheel) to protect the occupant.

For example, the airbag apparatus is installed on/in an interior component of a vehicle such as a steering wheel and an instrument panel. Since the airbag apparatus is installed on/in the interior component, the improvement of an appearance and a tactile impression of the airbag apparatus has been desired.

The airbag apparatus having a specific airbag cover, which is one of the components of the airbag apparatus and is disposed under usual condition (condition where the airbag apparatus is not activated), has been known (for example, Japanese Patent Application Laid-Open No. 2005-104307). The above-mentioned airbag cover has a cover core, an outer layer layered on an outer surface of the cover core. The airbag cover, under the usual condition, covers an airbag folded in an airbag module and can provide a good appearance desired for an interior component by the outer layer.

SUMMARY OF THE INVENTION

It has been desired that an ornament for displaying a character or a mark (logo) is attached on an airbag cover as an interior component. It is also desired that complication in forming the airbag cover is prevented in case where the ornament is attached on the airbag cover.

However, a structure for attaching an ornament on an airbag cover having an outer layer is not disclosed in the above-mentioned Laid-open application.

Therefore, an object of the present invention is to provide an airbag cover with which an outer layer can be easily formed in case of attaching an ornament.

An aspect of the present invention provides an airbag cover for an airbag apparatus, which comprises a cover main body having a cover core covering an airbag and an outer layer disposed on an outer surface of the cover core, an ornament provided on an outer surface of the outer layer, and a fixing structure for fixing the ornament on the outer surface of the outer layer. And, an edge of the outer layer on the outer surface is covered by the ornament.

According to the aspect of the present invention, since the edge of the outer layer on the outer surface is covered by the ornament, a treatment for improving an appearance of the edge is not needed. As a result, it can be easy to form the outer layer.

DETAILED DESCRIPTION OF THE EMBODIMENT

An embodiment of the present invention will be described with reference to the drawings. An airbag cover of the present embodiment is an example applied to an airbag module installed on a steering wheel of a vehicle.

Figure 1:
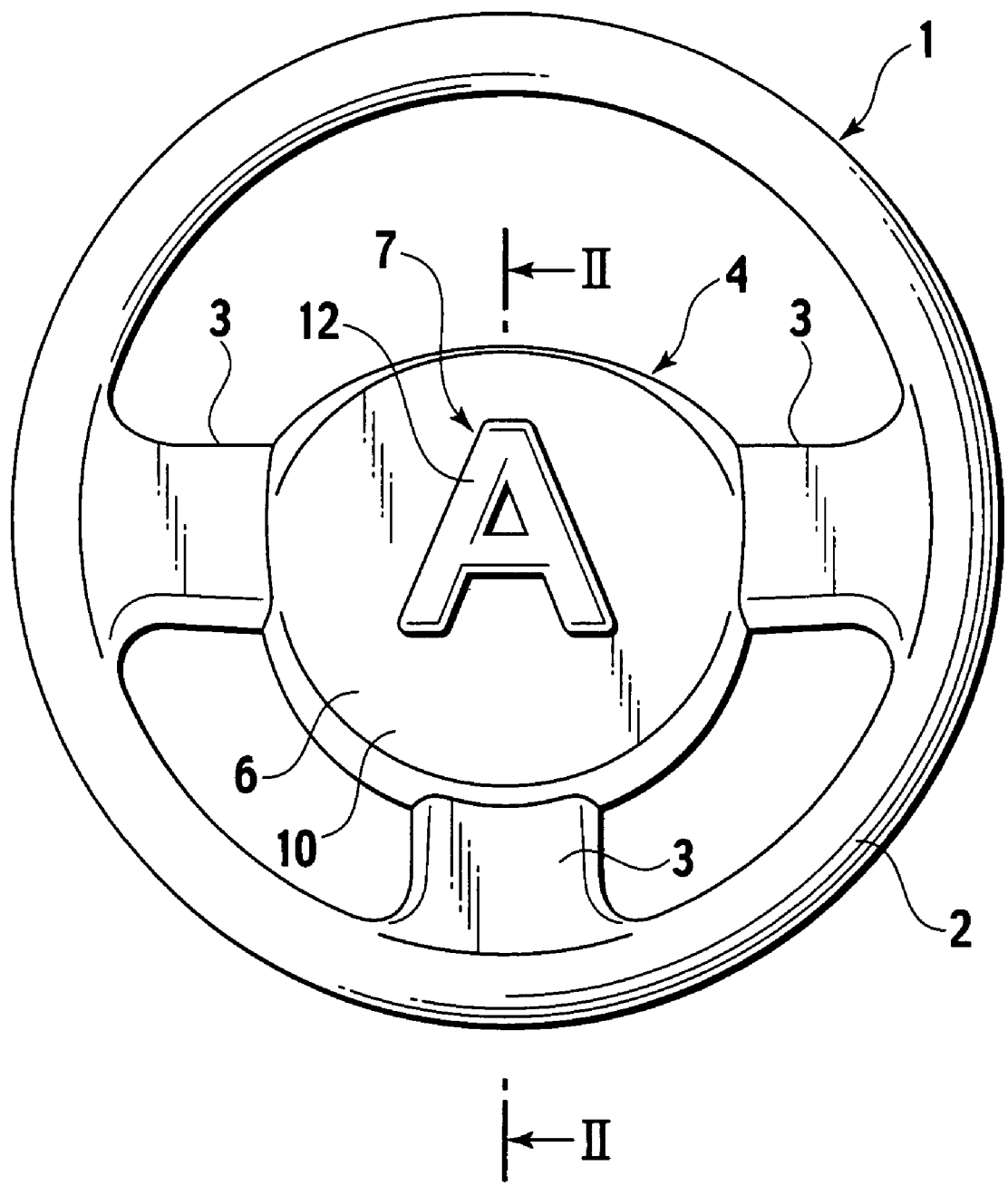
FIG. 1 is a front view of a steering wheel on which an airbag module, which has an embodiment of an airbag cover of an embodiment of the present invention, is installed.

As shown in FIG. 1, a steering wheel 1 comprises a ring-shaped grip 2, three spokes 3 extending from an inner circumference of the grip 2 toward a center of the steering wheel 1 and a boss (not shown) onto which the spokes 3 are attached. An airbag module, which has an airbag cover 4, is installed on the center of the steering wheel 1.

Figure 2:
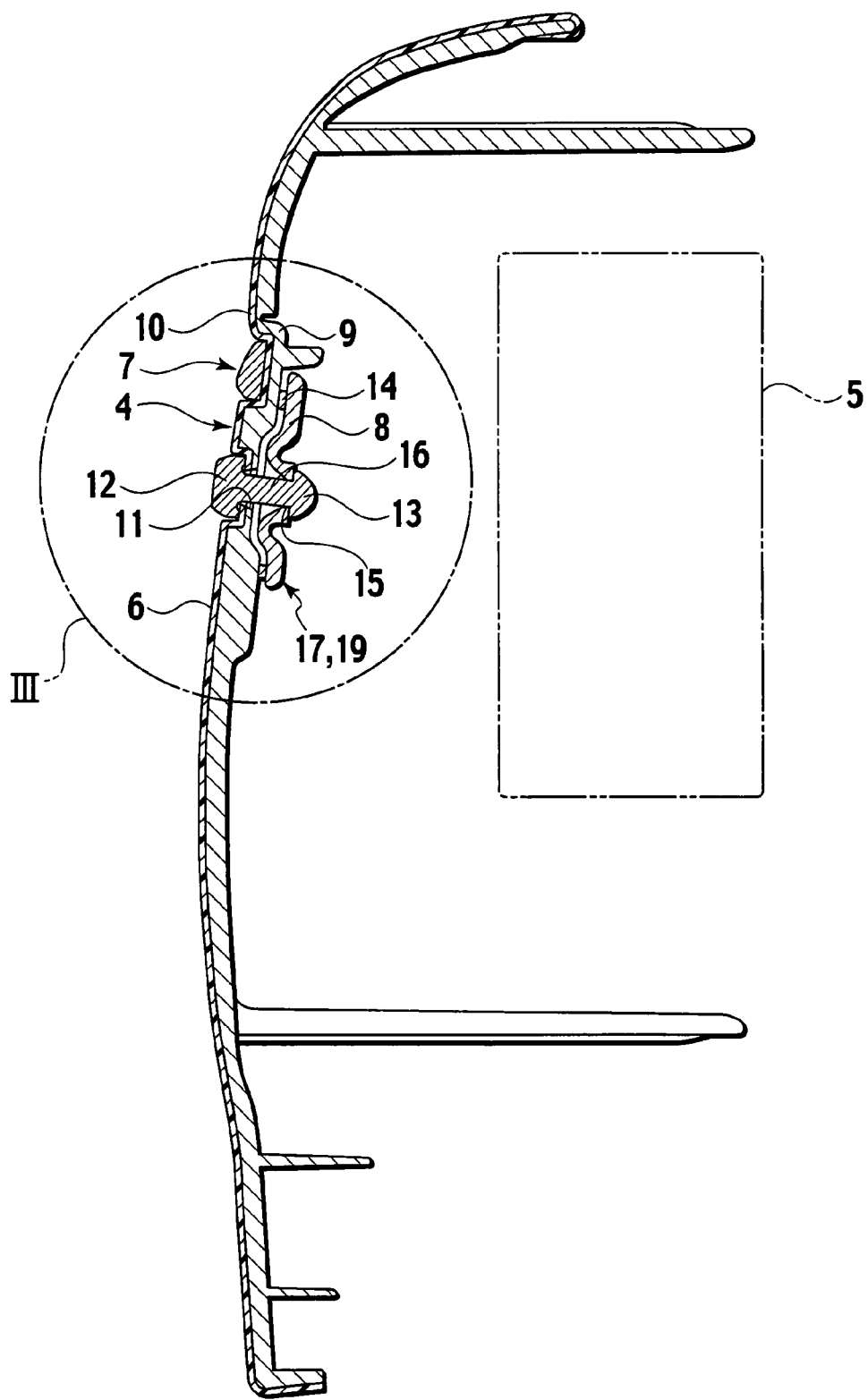
FIG. 2 is a cross sectional view of the airbag cover, taken along the line II-II in FIG. 1.

The airbag cover 4 covers an airbag 5 folded in the airbag module under normal condition (non-activated condition of an airbag apparatus) (see FIG. 2). The airbag 5 will be inflated and deployed by a gas supplied by an inflator (not shown) in case where the airbag apparatus is activated. The airbag 5 and the inflator are attached onto the boss via a base plate (not shown) of the airbag module. In addition, the airbag cover 4 constitutes the airbag module with the airbag 5, the inflator and so on.

Figure 3:
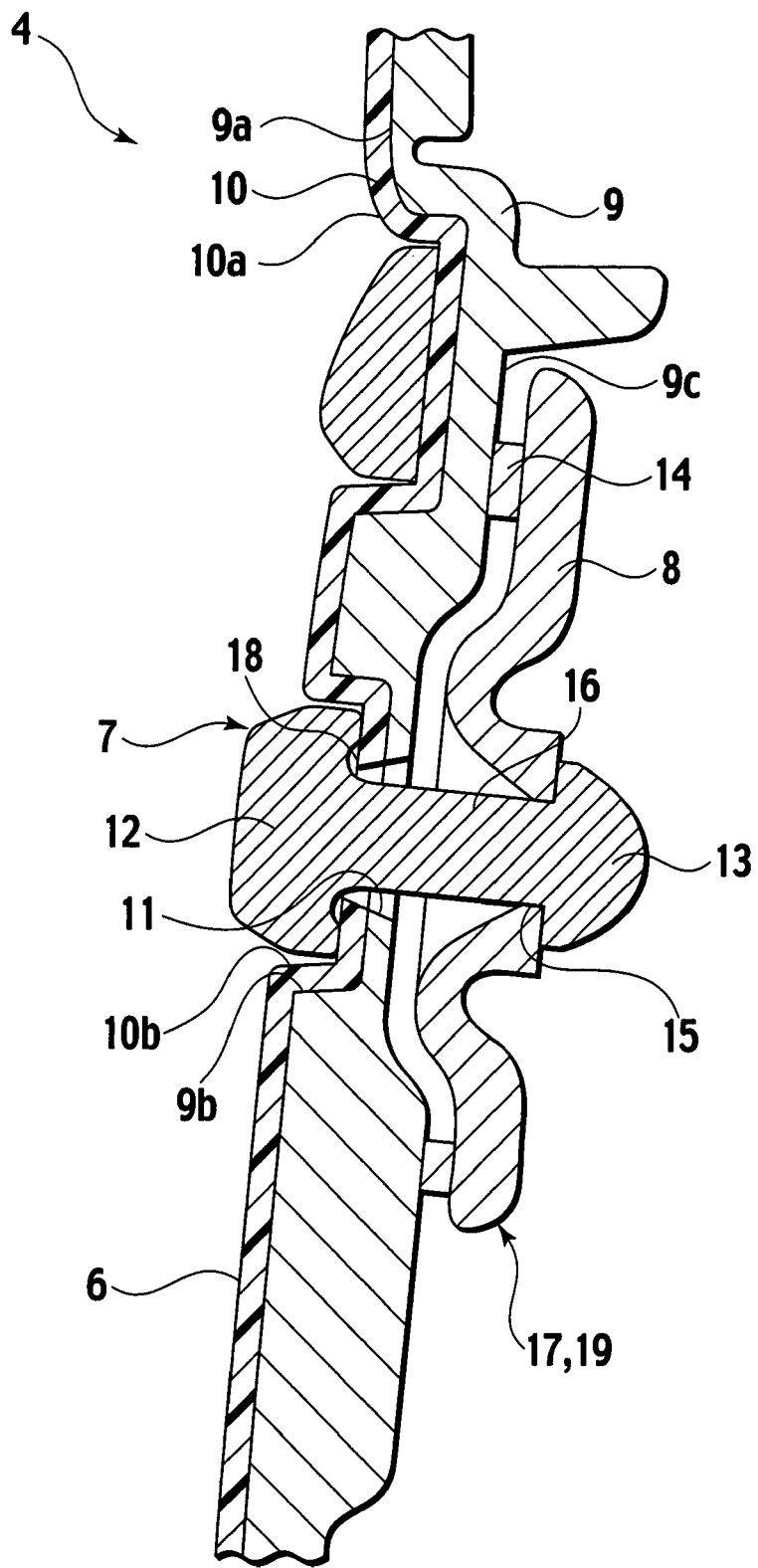
FIG. 3 is a close-up cross sectional view of the portion III in FIG. 2.

As shown in FIGS. 2 and 3, the airbag cover 4 includes a cover main body 6, an ornament 7 attached onto the cover main body 6 and a back plate 8 for fixing the ornament 7 on the cover main body 6.

As shown in FIGS. 2 and 3, the cover main body 6 is constituted by a cover core 9, which covers the airbag 5 with facing its inner surface 9c toward the airbag 5, and an outer layer 10 layered on an outer surface 9a of the cover core 9.

The cover core 9 is made of resin. It is preferable that the cover core 9 is made by injection molding of thermoplastic elastomer such as thermoplastic olefin (TPO). A recess 9b is formed on the outer surface 9a of the cover core 9 to mount the ornament 7. In addition, grooved tear lines (not shown) are provided on the inner surface 9c of the cover core 9. At the deployment of the airbag 5, since the cover core 9 is pressed from inside by the airbag 5, the cover main body 6 is torn along the tear lines to open the airbag cover 4.

The outer layer 10 is made of soft material softer than the cover core 9. Specifically, the outer layer 10 of the present embodiment is made of unfoamed polyurethane by reaction injection molding (RIM) and has a thin layer in substantially constant thickness. A recess 10b is also formed on an outer surface 10a of the outer layer 10 to mount the ornament 7 in accordance with the recess 9b of the cover core 9. The outer layer 10 is made by inert molding with the cover core 9.

Figure 4:
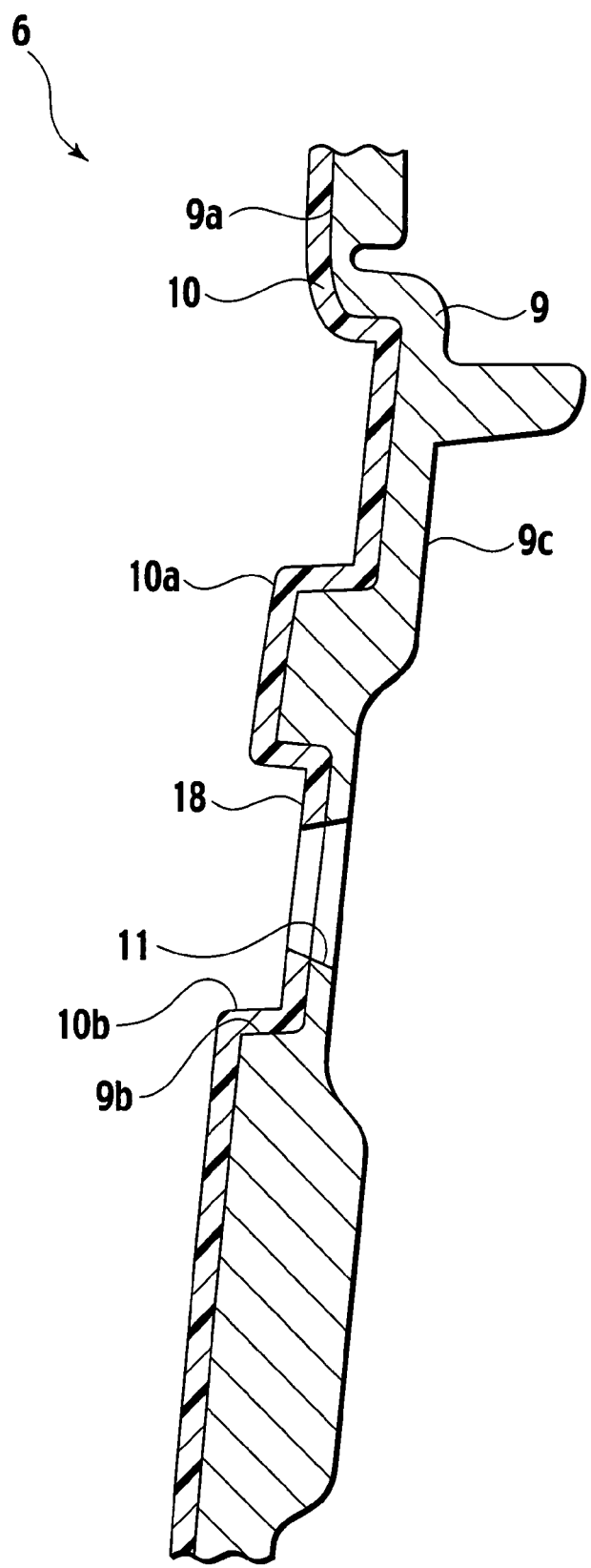
FIG. 4 is a cross sectional view of a cover main body shown in FIG. 3.

As shown in FIG. 4, an attachment hole 11, which penetrates the cover core 9 and the outer layer 10, is formed on the cover main body 6. A circumferential inner edge 18 of the attachment hole 11 is rimmed with the outer layer 10 in a front view.

As shown in FIG. 3, the ornament 7 comprises an ornament body 12 mounted on the outer surface 10a of the outer layer 10, a rod 16 projecting from the back face of the ornament body 12 and being inserted into the attachment hole 11 and a barbed end 13 formed on a distal end of the rod 16. The ornament 7 is made by integral molding of these elements. Specifically, the ornament 7 is made by injection molding of TPO or polyester elastomer (TPEE: thermoplastic polyester elastomer, for example, PELPRENE which is a trademark of Toyobo Co., Ltd.) and surface treatment thereon such as plating or painting.

In the present embodiment, the ornament body 12 displays a character "A". The ornament body 12 covers the attachment hole 11 and the edge of the outer layer 10 on the outer surface 10a (=the circumferential inner edge 18 of the attachment hole 11).

The back plate 8 has bosses 14 contacting on the inner surface 9c of the cover core 9. And a through hole 15 engaged with the barbed end 13 is formed on the back plate 8. The back plate 8 and the barbed end 13 constitute an attaching portion 17. The back plate 8 (the attaching portion 17) is provided behind the inner surface 9c of the cover core 9 and engaged with the rod 16. In addition, the back plate 8 (the attaching portion 17) fixes the ornament 7 (the ornament body 12) with the cover core 9 in a state where the outer layer 10 and the cover core 9 are sandwiched by the ornament 7 (the ornament body 12) and the back plate 8. The back plate 8 (the attaching portion 17), the attachment hole 11 and the rod 16 constitute a fixing structure 19. The ornament 7 (the ornament body 12) is fixed on the outer surface 10a of the outer layer 10 by the fixing structure 19. The back plate 8 is made of modified polyphenylene oxide (PPO). Alternatively, the back plate 8 may be made of polycarbonate, nylon 66, etc.

A process for attaching the ornament onto the cover main body 6 will be described. At first, the rod 16 of the ornament 7 is inserted into the attachment hole 11 of the cover main body 6. Next, the ornament body 12 of the ornament 7 is inserted within the recess 10b of the outer layer 10 to mount the ornament body 12 on the outer surface 10a of the outer layer 10. At this moment, the barbed end 13 is not yet formed on the distal end of the rod 16 (this is not shown in the drawings). Next, the rod 16 is inserted into the thorough hole 15 of the back plate 8. The barbed end 13 is formed on the distal end of the rod 16 under the condition where the bosses 14 of the back plate are contacted on the inner surface 9c of the cover core 9.

If the ornament 7 is made of resin, the barbed end 13 may be formed by melting the distal end of the rod 16. If the ornament 7 is made of metal, the barbed end 13 may be formed by riveting the distal end of the rod 16. In this manner, the ornament 7 (the ornament body 12) is fixed with the cover core 9 in a state where the outer layer 10 and the cover core 9 are sandwiched by the ornament 7 (the ornament body 12) and the back plate 8 (the attaching portion 17). Here, the ornament 12 contacts on the outer surface 10a and receives elastic recovery force from the outer layer 10.

In the present embodiment, as described above, since the edge of the outer layer 10 on the outer surface 10a (=the circumferential inner edge 18 of the attachment hole 11) is covered by the ornament body 12, a treatment for improving an appearance of the edge 18 is not needed. As a result, it can be easy to form the outer layer 10. For Example, the treatment for improving the appearance may be a treatment of removing mold flashes had been formed on the edge 18 and so on.

Furthermore, in the present embodiment, the fixing structure 19 includes the attachment hole 11, which is formed by penetrating the outer layer 10 and the cover core 9 and covered by the ornament 7, and the back plate 8, which is provided behind the cover core 9 and engaged with the rod 16. The ornament 7 is fixed with the cover core 9 in a state where the outer layer 10 and the cover core 9 are sandwiched by the ornament 7 and the back plate 8. Therefore, the ornament 7 can be firmly fixed with the cover core 9.

Here, a following attaching method may be also conceivable. An ornament is mounted on an outer surface of a cover core and a mounting hole is formed in an outer layer. However, since an inner edge of the mounting hole is exposed in this case, an appearance may not be good. On the contrary, in the present embodiment, since the edge 18 of the attachment hole 11 is covered by the ornament 7 as mentioned above, the appearance of the airbag cover 4 can be provide excellent appearance.

Furthermore, in the present embodiment, since the ornament body 12 is held with being received the elastic recovery force from the outer layer 10, a poor-looking gap between the ornament body 12 and the outer layer 10 is prevented. As a result, the appearance of the airbag cover 4 may be further improved.

In addition, in the present embodiment, even if the ornament body 12 would contact with some objects at the deployment of the airbag cover 4 after a vehicle collision, breakage of the ornament body 12 is prevented. Since an impactive force to the ornament body 12 is absorbed by compressional deformation of the outer layer 10, the breakage of the ornament 7 is prevented.

Furthermore, in the present embodiment, since the outer layer 10 is made of unfoamed polyurethane, a tactile impression of the outer layer 10 can be improved. In addition, since the unfoamed polyurethane provides a good moldability (flowability), mass-productivity of the airbag cover 4 can be improved. Since thin outer skin, which has almost constant thickness and can be easily torn at airbag inflating and deployment, is formed on the surface, appropriate airbag deployment doors are provided.

Furthermore, since the outer layer 10 is made of unfoamed polyurethane, the tear lines of the air bag cover 4 can be torn unfailingly. Therefore, the airbag cover 4 can be opened smoothly at the deployment of the airbag 5 and the airbag 5 can inflate and deploy to protect a driver firmly.

The present invention is not limited to the above-mentioned embodiment. The each configuration can be replaced with another configuration having the same functions within the scope of the present invention. For example, the ornament 7 displays the character "A" in the above-mentioned embodiment, but it is not limited to this. An ornament may display another character(s) or mark(s).

In the above-mentioned embodiment, the airbag cover 4 of a driver-side airbag installed in the steering wheel 1 is described. However, the present invention is not limited to the airbag cover of the driver-side airbag. The airbag cover may be adapted to a passenger-side airbag installed on/in an instrument panel.

In the above-mentioned embodiment, the ornament body 12 and the rod 16 are molded integrally. However, they may be made separately and jointed each other by screw mounting and so on.

In the above-mentioned embodiment, the ornament 7 is attached on the outer surface 10a by a pair of the attachment hole 11 and the rod 16. However, one ornament may be attached on an outer surface of an outer layer by two or more pairs of an attachment hole and a rod. In this case, a back plate may be provided for all the pairs or a plurality of back plates may be provided for the pairs. In addition, two or more ornaments may be mounted on the outer layer.

What is claimed is:

1. An airbag cover for an airbag apparatus, comprising:
a cover main body having a cover core covering an airbag and an outer layer disposed on an outer surface of the cover core;
an ornament provided on an outer surface of the outer layer; and
a fixing structure for fixing the ornament on the outer surface of the outer layer,
wherein an edge of the outer layer on the outer surface is covered by the ornament, airbag deployment doors are formed on the cover main body, the edge of the outer layer is located within areas of the airbag deployment doors, and the ornament is affixed upon an airbag deployment door.

2. The airbag cover according to claim 1, wherein the fixing structure includes a attachment hole, a rod included by the ornament and inserted into the attachment hole and a back plate provided behind the cover core and engaged with the rod, and the ornament is fixed with the cover core in a state where the outer layer and the cover core are sandwiched by the ornament and the back plate.

3. The airbag cover according to claim 2, wherein the outer layer is made of unfoamed polyurethane.

4. The airbag cover according to claim 3, wherein the ornament is fixed with the cover core in a state where the ornament receives elastic recovery force from the outer layer.

5. The airbag cover according to claim 1, wherein the cover main body has a recess receiving the ornament and the edge of the outer layer on the outer surface is formed within the recess.

* * * * *